(12) United States Patent
Oshman

(10) Patent No.: US 12,024,132 B1
(45) Date of Patent: Jul. 2, 2024

(54) BIKE RACK WITH ROTATING PLATFORM FOR EASY ROLL-UP LOADING

(71) Applicant: Joseph Oshman, Portland, OR (US)

(72) Inventor: Joseph Oshman, Portland, OR (US)

( * ) Notice: Subject to any disclaimer, the term of this patent is extended or adjusted under 35 U.S.C. 154(b) by 0 days.

(21) Appl. No.: 18/226,700

(22) Filed: Jul. 26, 2023

(51) Int. Cl.
| B60R 9/10 | (2006.01) |
| B60R 9/06 | (2006.01) |
| B62H 3/08 | (2006.01) |
| B60R 11/00 | (2006.01) |

(52) U.S. Cl.
CPC ............... B60R 9/10 (2013.01); B60R 9/06 (2013.01); B62H 3/08 (2013.01); *B60R 2011/0085* (2013.01)

(58) Field of Classification Search
CPC ..... B60R 9/10; B60R 9/06; B60R 2011/0085; F41C 33/045
USPC ............................................... 224/198
See application file for complete search history.

(56) References Cited

U.S. PATENT DOCUMENTS

| 4,189,274 | A * | 2/1980 | Shaffer ............... B60R 9/10 224/570 |
| 6,139,247 | A * | 10/2000 | Wright ............... B60R 9/06 414/470 |
| 6,602,015 | B1 * | 8/2003 | Evans ............... F16B 45/027 403/109.5 |
| 6,685,421 | B1 * | 2/2004 | Reeves ............... B60P 1/4407 414/540 |
| 7,811,045 | B2 * | 10/2010 | Butta ............... B66D 3/02 414/469 |
| 7,841,821 | B2 * | 11/2010 | Miro ............... B60R 9/08 224/524 |
| 9,102,286 | B1 * | 8/2015 | Deming ............... B60R 9/06 |
| 9,987,994 | B2 * | 6/2018 | Fifield ............... B60R 9/10 |
| 10,752,066 | B2 * | 8/2020 | Rodriguez ........... B60D 1/1675 |
| 11,318,996 | B2 * | 5/2022 | Gouma ............... B62D 27/02 |
| 11,643,001 | B1 * | 5/2023 | Thompson ............... B62K 7/04 414/462 |
| 2002/0154980 | A1 * | 10/2002 | Potts ............... B60R 9/06 414/470 |

* cited by examiner

*Primary Examiner* — Scott T McNurlen
(74) *Attorney, Agent, or Firm* — Mohr Intellectual Property Law Solutions, P.C.

(57) ABSTRACT

The invention is a bike rack with a rotating platform mechanism to ease the loading and unloading of bicycles. The present disclosure is directed to a bike rack coupled to a rotating platform. The rotating platform is a mechanism that allows the rack to perform its dual functions. The rotating platform comprises a series of plates. One plate is a faceplate, and the remainder are tilt plates. A pin is coupled with the faceplate. The tilt plate has a slot with two stops. One stop defines the driving position, and the second defines the tilt position. The pin passes through the tilt slot and retains the platform in the driving or tilt positions. Optionally a third tilt plate locks the platform in either position. Optionally, the faceplate and tilt plate(s) are coupled to a pivot that is off-center from the centerline of the platform.

13 Claims, 12 Drawing Sheets

BIKE RACK WITH ROTATING PLATFORM FOR EASY ROLL-UP LOADING

BACKGROUND

Cycling is a favored pastime, and many cyclists transport their bikes to a destination to ride their bikes. Bike racks are often used to transport the bike. Using a bike requires the loading and unloading the bike, usually by lifting the bike on and off the rack. Which is a cumbersome task. Moreover, the task becomes more cumbersome for electric bikes because they are much heavier than traditional bike, with some bikes weighing as much as 25-27 kg (approximately 55 to 60 lbs.). The invention seeks to make the loading and unloading of bikes easier by providing a bike rack that tilts to provide an inclined plane or ramp for the bike to roll up or down during loading and unloading. Using a ramp eliminates the need for the cyclist to lift the bike on or off the bike rack.

Typically hitch, mounted bike racks must be mounted at a height to provide ground clearance and a departure angle for the vehicle to navigate angled roads. Ground clearance requires the bike loading position to be higher than the ground, and lifting the bike is required to load the bike onto the bike rack. Other racks tilt but require the attachment of a separate ramp to facilitate rolling the bike onto the rack.

The bike rack of the present invention has an integral ramp. When tilted, the side closest to the ground is a ramp allowing the user to roll the bike up to the driving clearance height. The primary benefits include the ease of use for loading and self-leveling the platform without attaching a secondary ramp. Further benefits include fewer items to manipulate or store on the rack and the platform angled to accommodate a compact arrangement of bikes at different heights.

SUMMARY

The rack mechanism has a spring-loaded pin that is pulled to allow the platform to tilt. When the user pushes the bike up, the user force will approach the tilting point, and the rack will level out. Once level, a spring-loaded pin will engage the driving position hole and snap back to hold the platform and bike level for everyday driving. The present disclosure is directed to a bike rack and a rotating platform. The rotating platform is a mechanism that allows the rack to perform its dual functions. The rotating platform comprises a series of plates. One plate is a faceplate, and the remainder are tilt plates. A pin is coupled with the faceplate. The tilt plate has a slot with two stops. One stop defines the driving position, and the second defines the tilt position. The pin passes through the tilt slot and retains the platform in the driving or tilt positions. Optionally a third tilt plate locks the platform in either position. The faceplate and tilt plate(s) are coupled to a pivot that is off-center from the centerline of the platform.

DETAILED DESCRIPTION

The disclosed invention will become better understood by reviewing the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

The following detailed description provides an example of a bike rack with a rotating platform. Related features in the examples may be identical, similar, or dissimilar in different examples. For the sake of brevity, related features will not be redundantly explained in each example. Instead, using related feature names will cue the reader that the feature with a related name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein unless otherwise indicated.

"Comprising," "including," and "having" (and conjugations thereof) are used interchangeably to mean including but not necessarily limited to and are open-ended terms not intended to exclude additional elements or method steps not expressly recited.

"Concentric" means having a common center.

"Coupled" means connected, either permanently or releasably, whether directly or indirectly, through intervening components.

"Detent" is a mechanism that temporarily keeps one part in a certain position relative to another and can be released by applying force to one of the parts.

"Pin" is a device that permanently, or reversibly holds parts in place regardless of shape. A pin might be cylindrical, flat, rectangular, triangular, or any other suitable shape.

A "hole" is a receptacle for the pin. Its shape and location are adapted to accommodate the pin.

Terms such as "first," "second," and "third" are used to distinguish or identify various members of a group or the like and are not intended to denote a serial, chronological, or numerical limitation.

Bike Rack with Rotating Platform for Easy Roll-Up Loading

Figure 1:
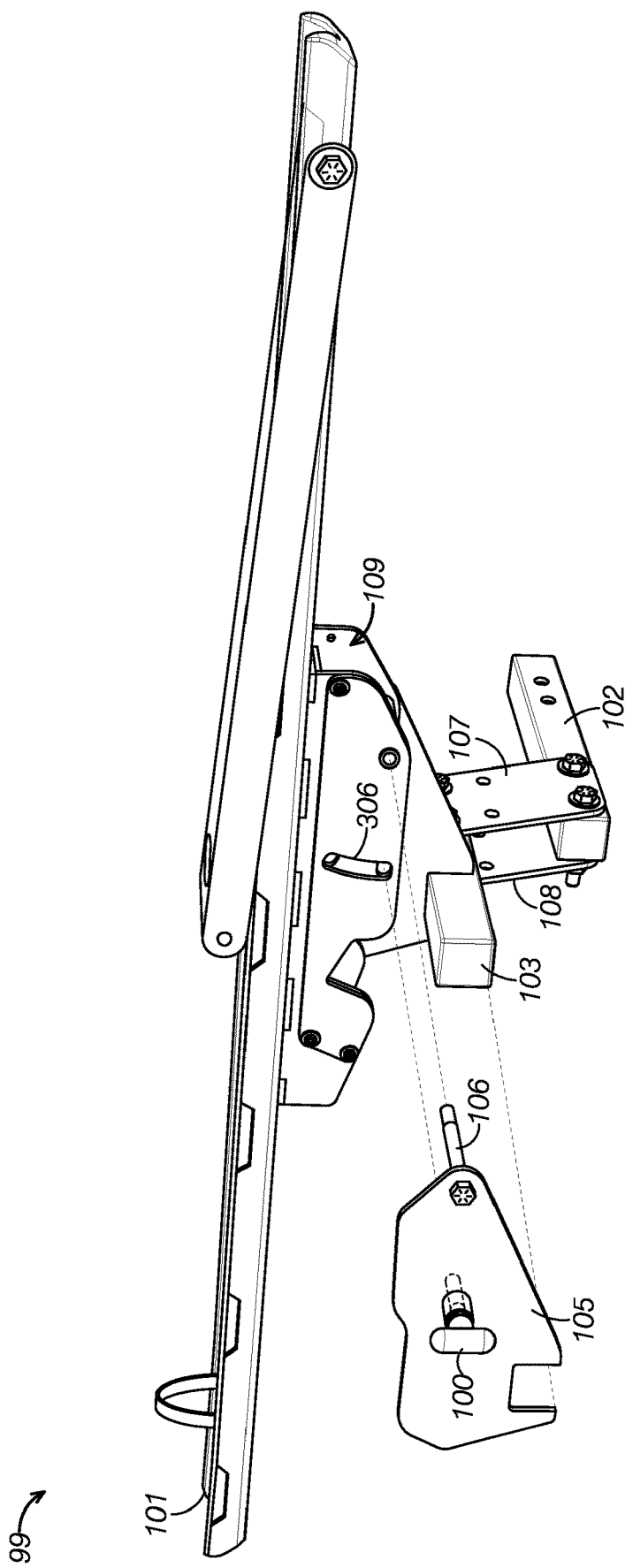
FIG. 1 is a front view of the bike rack with the rotating platform.
Figure 2:
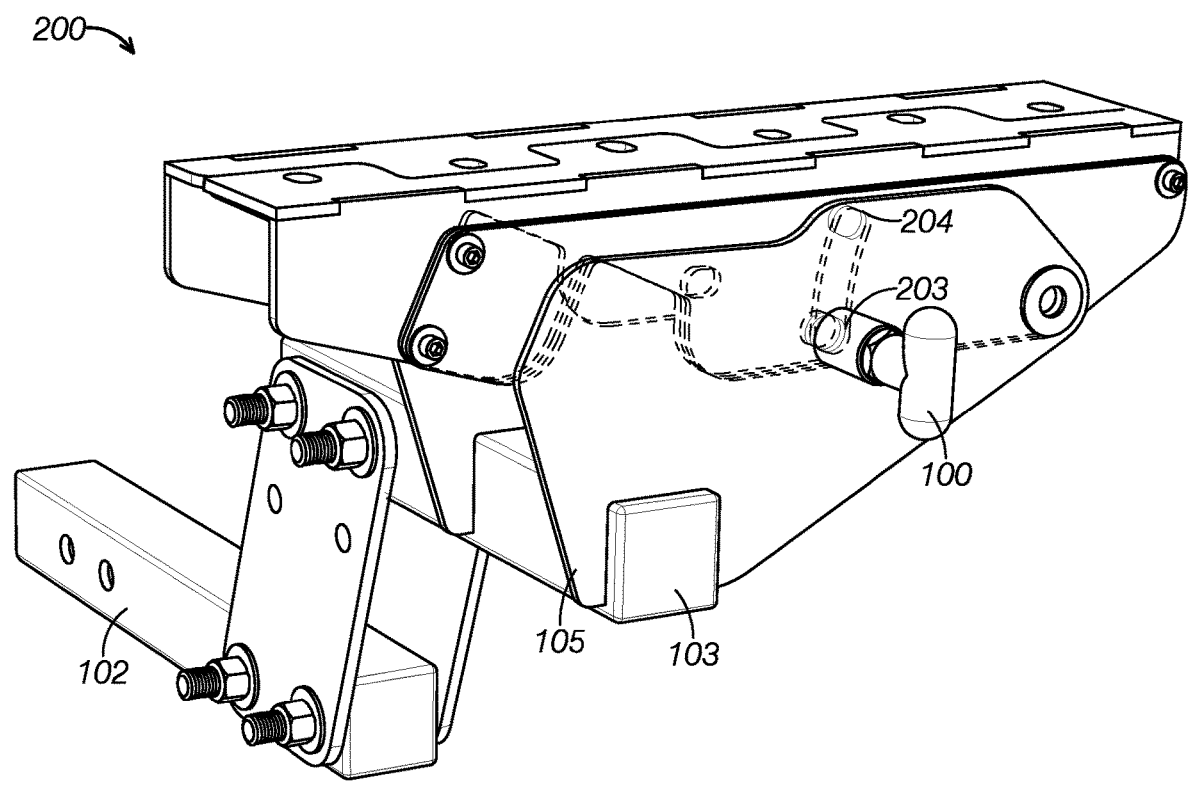
FIG. 2 is a perspective view of the rotating platform in the driving position.
Figure 3:
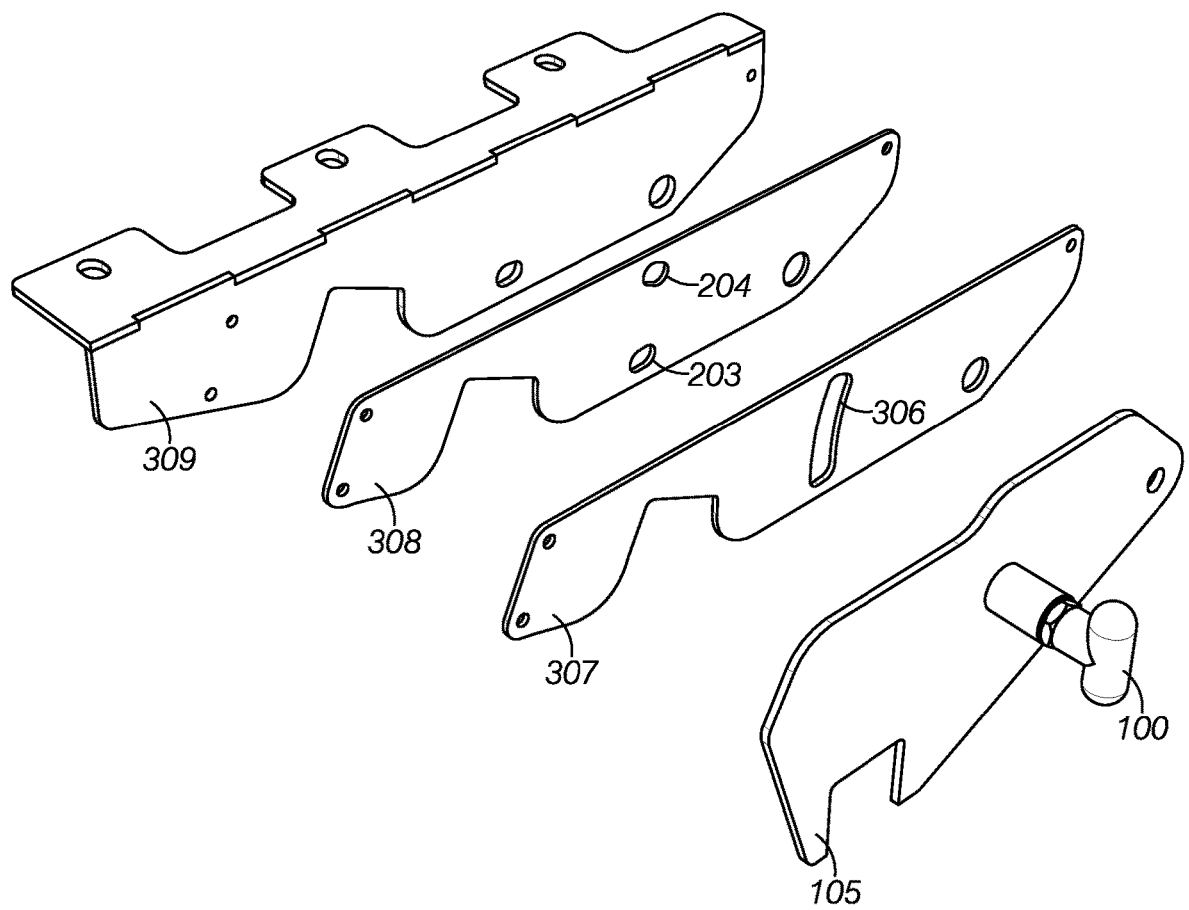
FIG. 3 is an exploded view of the rotating platform.
Figure 4:
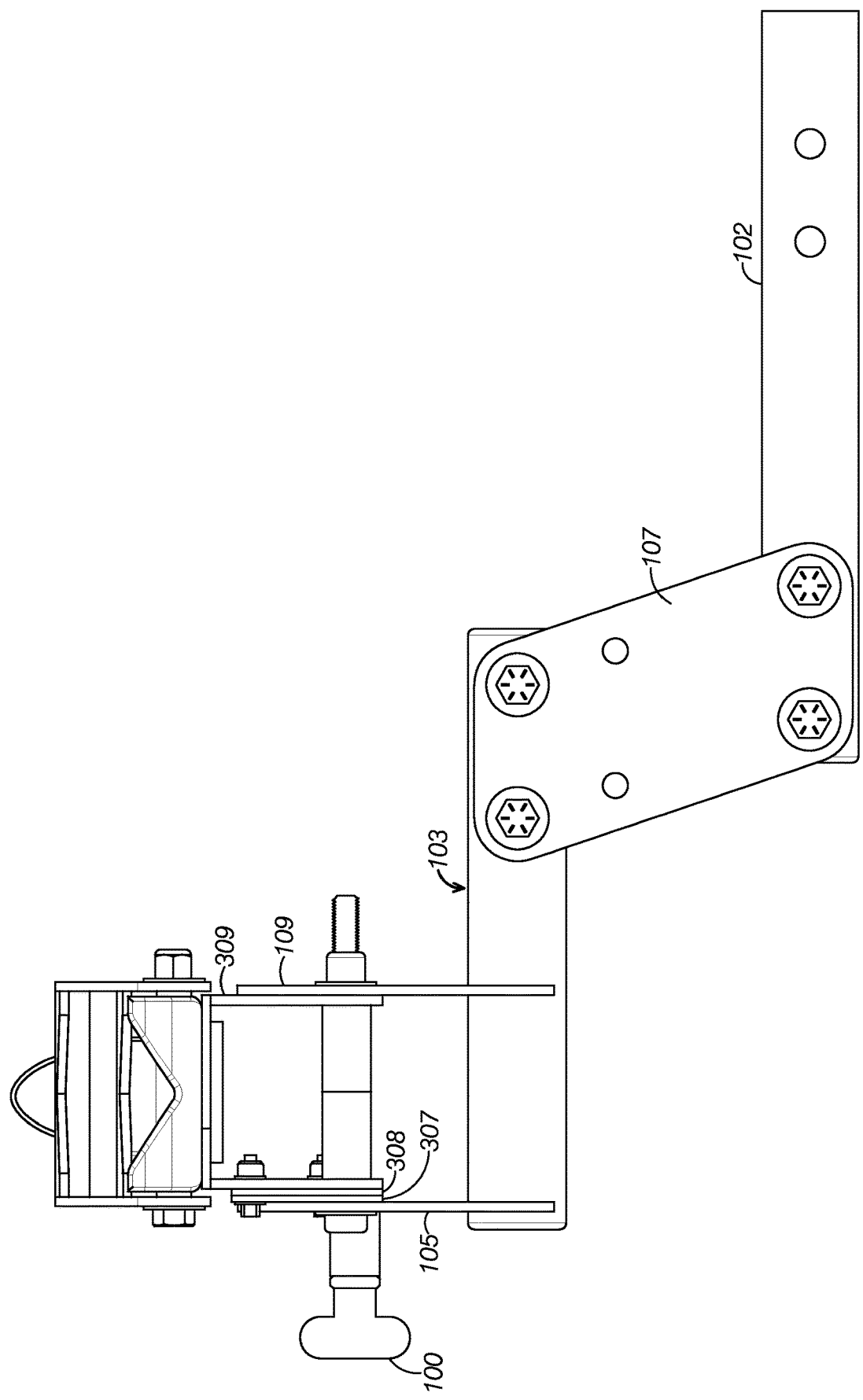
FIG. 4 is a side view of the rotating platform in the driving position showing the spring-loaded pin engaged in the driving position.
Figure 5:
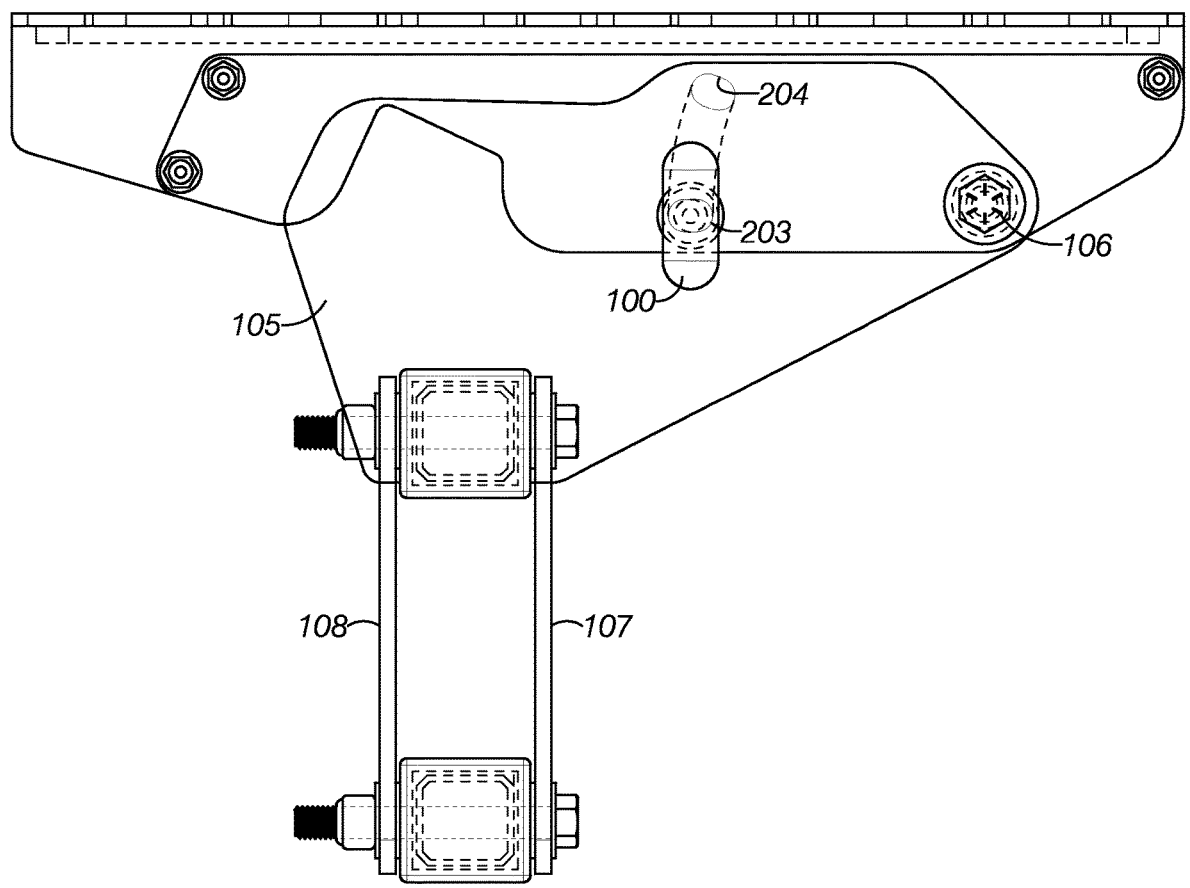
FIG. 5 is a front view of the rotating platform in the driving position.

Referring to FIGS. 1-12, BIKE RACK WITH ROTATING PLATFORM FOR EASY ROLL-UP LOADING will now be described. FIG. 1 shows the bike rack with rotating platform 99, and FIG. 2 shows the rotating platform 200. The rotating platform 200 puts the bike rack in two different positions: a driving and a tilt position. In the tilt position, the rack doubles as a ramp to ease the loading and unloading of bike 700. Thus, the terms bike rack, rack, and ramp are interchangeable for this disclosure. Referring to FIGS. 1-3, pin 100 retains ramp 101 in the driving or tilted positions. Ramp 101 aids in loading and unloading bike 700 and retains bike 700 during transport. Pin 100 passes through the tilt slot 306 and may engage hole 203 or hole 204. When pin 100 is engaged with hole 203, ramp 101 is in the driving position; when pin 100 is engaged with hole 204, ramp 101 is in the tilted position. Tilt slot 306 defines the driving stop and the tilt stop. Pin 100 is coupled to faceplate 105. Platform 200 rotates around pivot 106 (FIG. 5).

Figure 6:
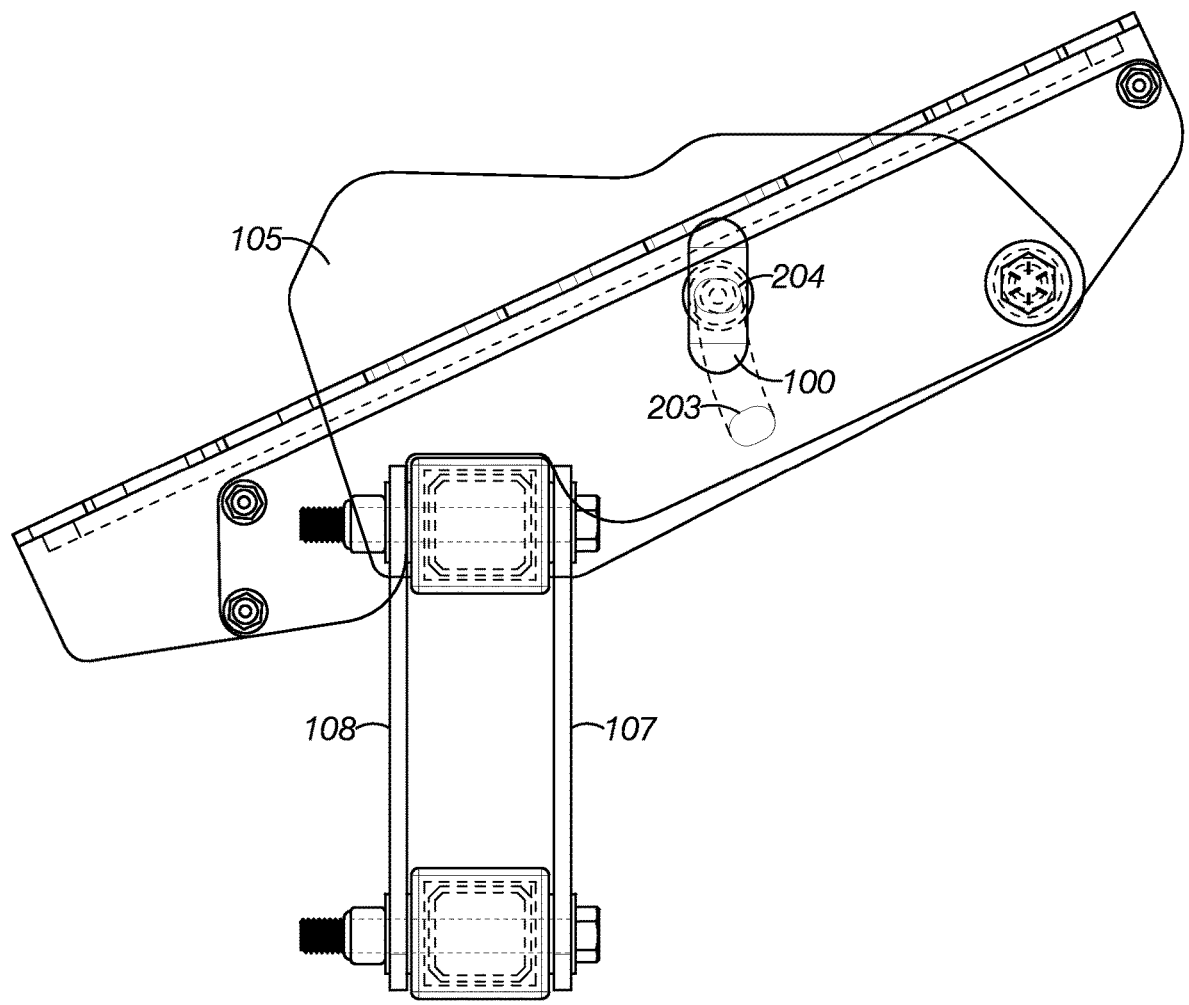
FIG. 6 is a front view of the rotating platform in the tilt position.
Figure 7:
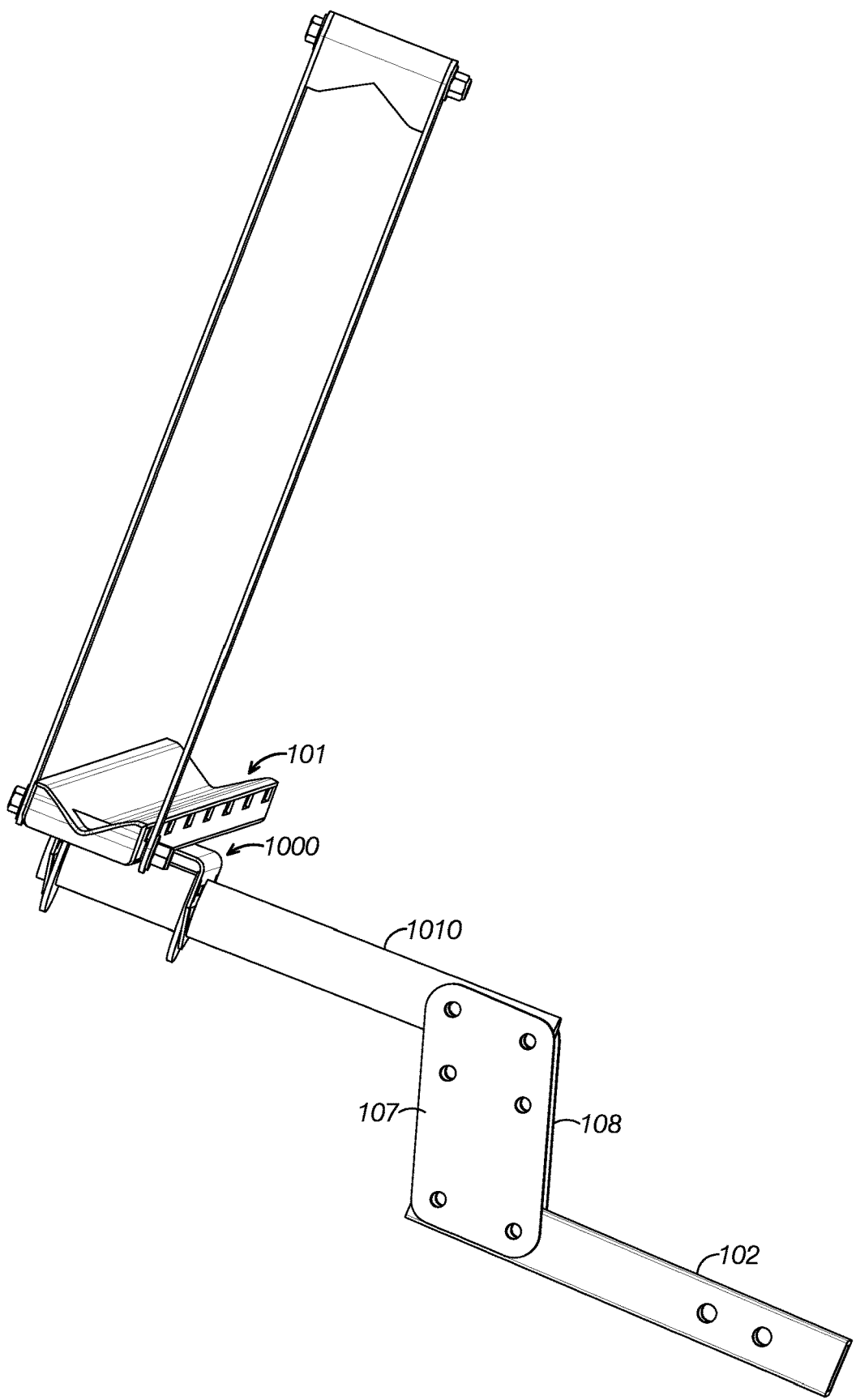
FIG. 7 is a perspective view of the bike rack attached to the sixth embodiment of the rotating platform.

In the first embodiment, when loading or unloading bike 700, user 701 disengages pin 100 from hole 203, moves ramp 101 to the tilt stop and engages pin 100 with hole 204 (FIG. 6). Then user 701 rolls bike 700 up ramp 101 and secures bike 700 to the rack. User 701 then disengages pin 100 from hole 204, moves ramp 101 from the tilt position (FIG. 6) to the driving position (FIG. 5) and re-engages pin 100 with hole 203.

In a second embodiment, pin 100 is spring-loaded and chamfered. Additionally, hole 204 is a detent. In this embodiment, hole 204 temporarily holds ramp 101 in the tilt position until user force from rolling bike 700 up ramp 101 causes pin 100 to automatically disengage from detent hole 204 and rotate 900 about pivot 106 (see FIG. 11). Spring-loaded pin 100 automatically engages hole 203 and locks ramp 101 in the driving position.

In a third embodiment, rotating platform 200 comprises faceplate 105, tilt plate 307, tilt plate 308, tilt plate 309, and back tilt plate 109; pin 100 is coupled to faceplate 105, and pivot 106 is coupled to faceplate 105. Tilt plate 307 has tilt slot 306. Tilt plate 308 has hole 203 and hole 204. Where tilt slot 306 is concentric with holes 203 and 204. Tilt plate 309 has a hole concentric with hole 203. Pivot 106 passes through tilt plates 307, 308, and 309. Pin 100 is chamfered and spring-loaded. Pin 100 passes through tilt slot 306. At the driving stop, pin 100 passes through hole 203 and the concentric hole in tilt plate 309. At the tilt stop, pin 100 passes through hole 204. Hole 204 is a detent.

In a fourth embodiment, the rotating platform comprises faceplate 105, tilt plate 307, tilt plate 308, tilt plate 309, and back plate 109. Pin 100 is coupled to faceplate 105, and pivot 106 is coupled to faceplate 105. Tilt plate 307 has tilt slot 306. Tilt plate 308 has hole 203 and hole 204. Tilt plate 309 has a hole concentric with hole 203. Pivot 106 passes through tilt plates 307, 308, 309, and back plate 109. Pivot 106 is offset from the centerline of rotating platform 200. Pin 100 is chamfered and spring-loaded. Pin 100 passes through tilt slot 306. At the driving stop, pin 100 passes through hole 203 and a concentric hole in tilt plate 309. A third hole is added between holes 203 and 204. The third hole is concentric with tilt slot 306 and is concentric with a corresponding hole in tilt plate 309. At the tilt stop, pin 100 passes through detent hole 204, or pin 100 passes through the third hole between holes 203 and 204, and a concentric hole in tilt plate 309.

The third hole in embodiment four allows user 701 to stagger platform 200 at an angle to accommodate a compact arrangement of bikes at different heights. Platform 200's angle enables the bars to nest with the adjacent bike better, thus providing a compact configuration. This embodiment envisions multiple holes between holes 203 and 204, allowing bikes to be staggered at different heights. Furthermore, hole 203 can be visualized as a slot concentric with a length less than tilt slot 306 (short slot), where the short slot is concentric with additional holes in tilt plate 309. One stop of the short slot would be the driving stop, where pin 100 engages a hole in tilt plate 309 to lock the platform 200 in the driving position. Additional holes in tilt plate 309 concentric with the length of the short slot provide multiple stops between the driving stop and the tilt stop, allowing user 701 to stagger the bikes at multiple heights.

Figure 10:
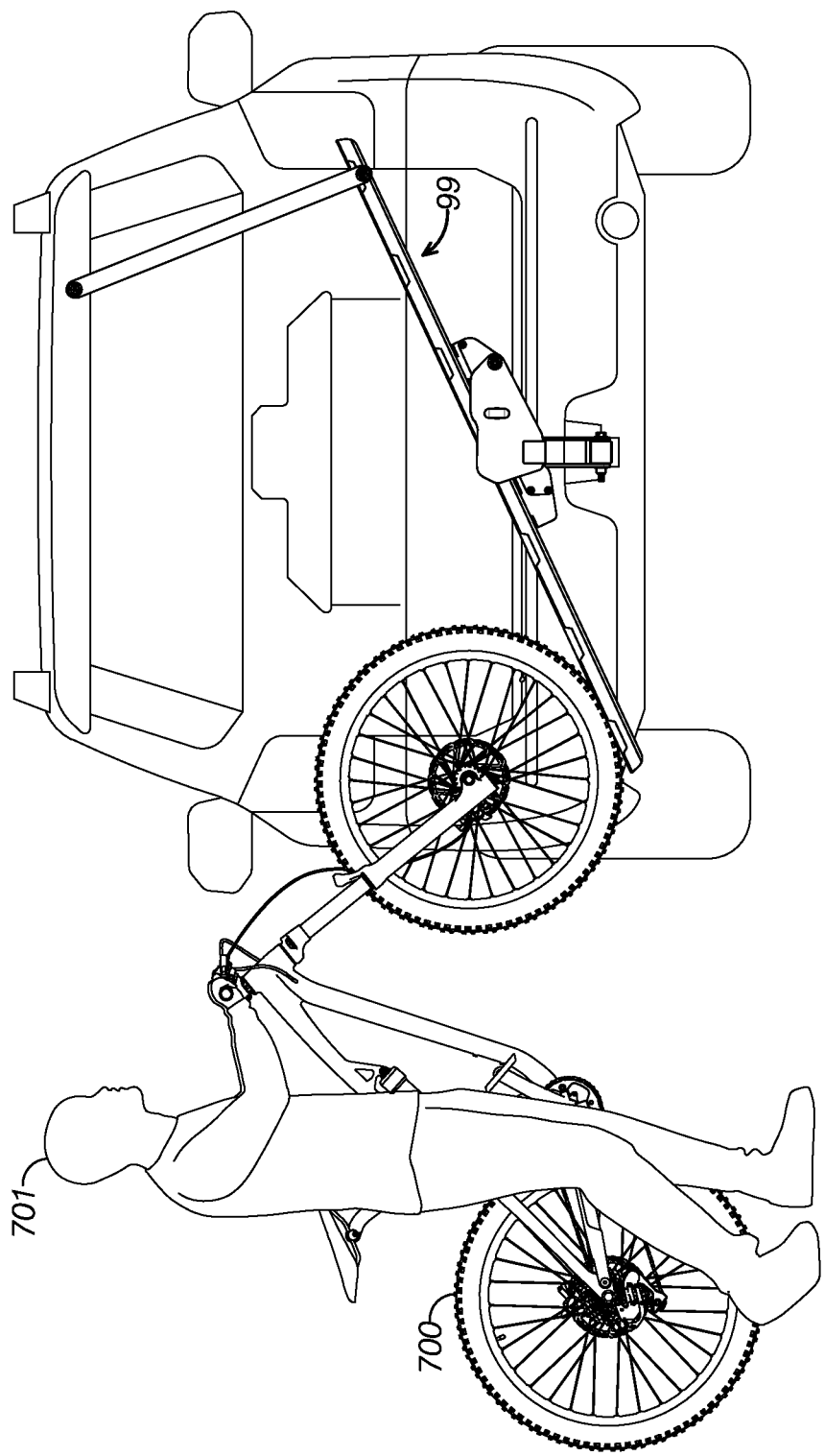
FIG. 10 is a front view of the rotating platform showing the bike rack in the tilt position where one end of the rack is close to the ground, displaying the rack as an integrated ramp.
Figure 11:
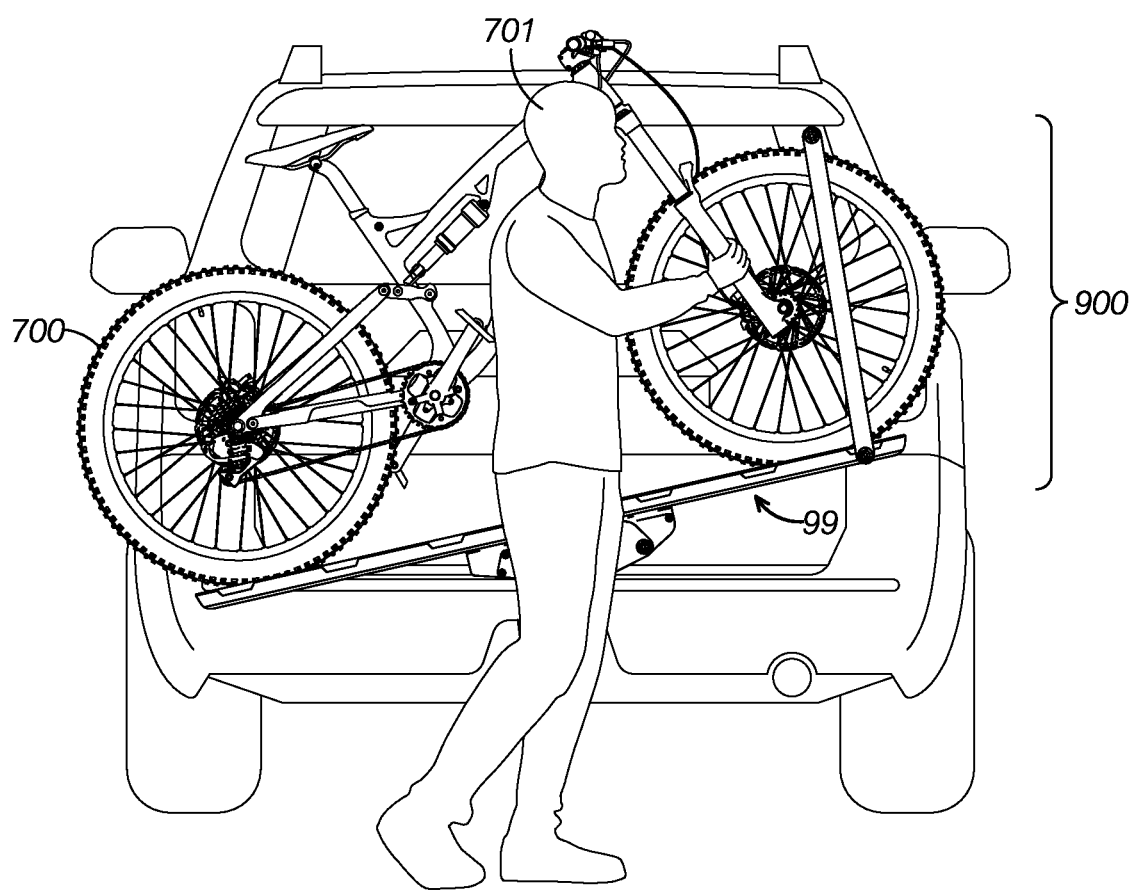
FIG. 11 is a front view of the rotating platform and bike rack where the user force of rolling the bike onto the bike rack causes the platform to rotate to the driving position.
Figure 12:
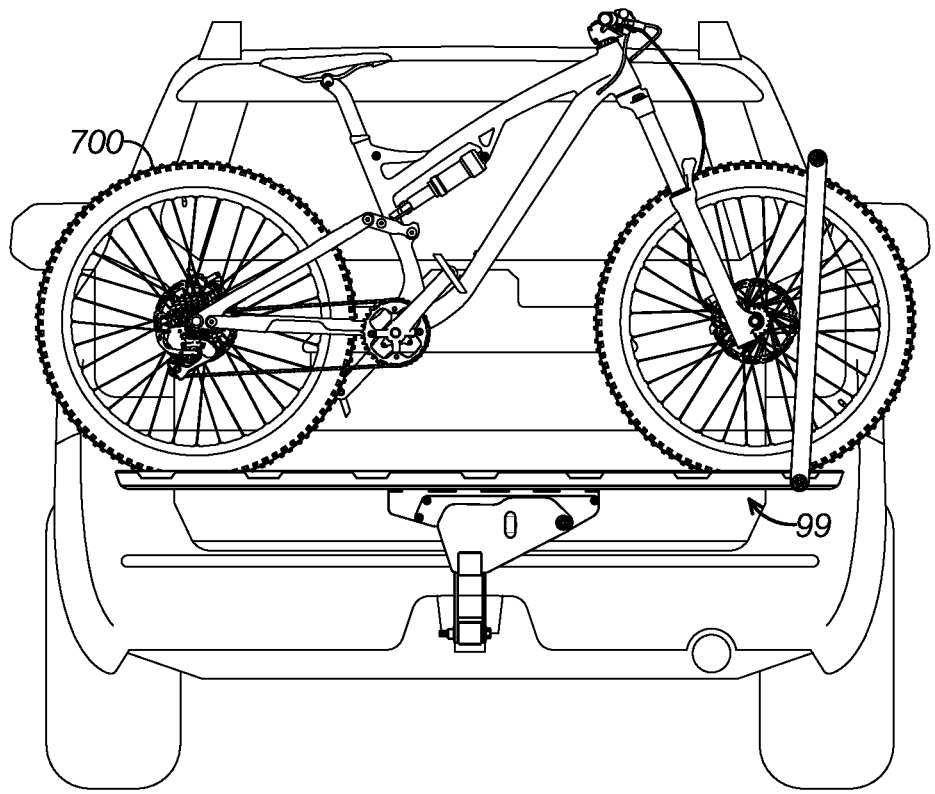
FIG. 12 is a front view of the rotating platform; showing the bike rack and bike in the driving position.

In a fifth embodiment, when loading bike 700, user 701 disengages pin 100 from hole 203, moves ramp 101 to the tilt stop, and pin 100 automatically engages with detent hole 204 (FIG. 6). The user 701 then rolls the bike 700 up ramp 101 (FIG. 10). User 701's force causes ramp 101 to rotate about pivot 106. Pin 100 automatically disengages detent hole 204, rotates to the driving stop (FIG. 11), and engages hole 203 in tilt plate 308 and the concentric hole in tilt plate 309, locking ramp 101 in the driving position (FIG. 12).

When unloading bike 700, user 701 disengages pin 100 from hole 203. User 701 then moves ramp 101 to the tilt stop, and pin 100 automatically engages with detent hole 204 (FIG. 6). The user 701 then rolls the bike 700 down ramp 101. (FIG. 10).

The bike rack and rotating platform 99 are coupled to rail 103 (FIGS. 1 & 4). Rail 103 is then coupled to tongue 102. Coupling can be accomplished by the non-limiting example of plates 107 and 108 bolted to rail 103 and tongue 102 (FIGS. 4 & 5). Tongue 102 attaches a bike rack and rotating platform 99 to a vehicle (FIGS. 9-12).

Figure 8:
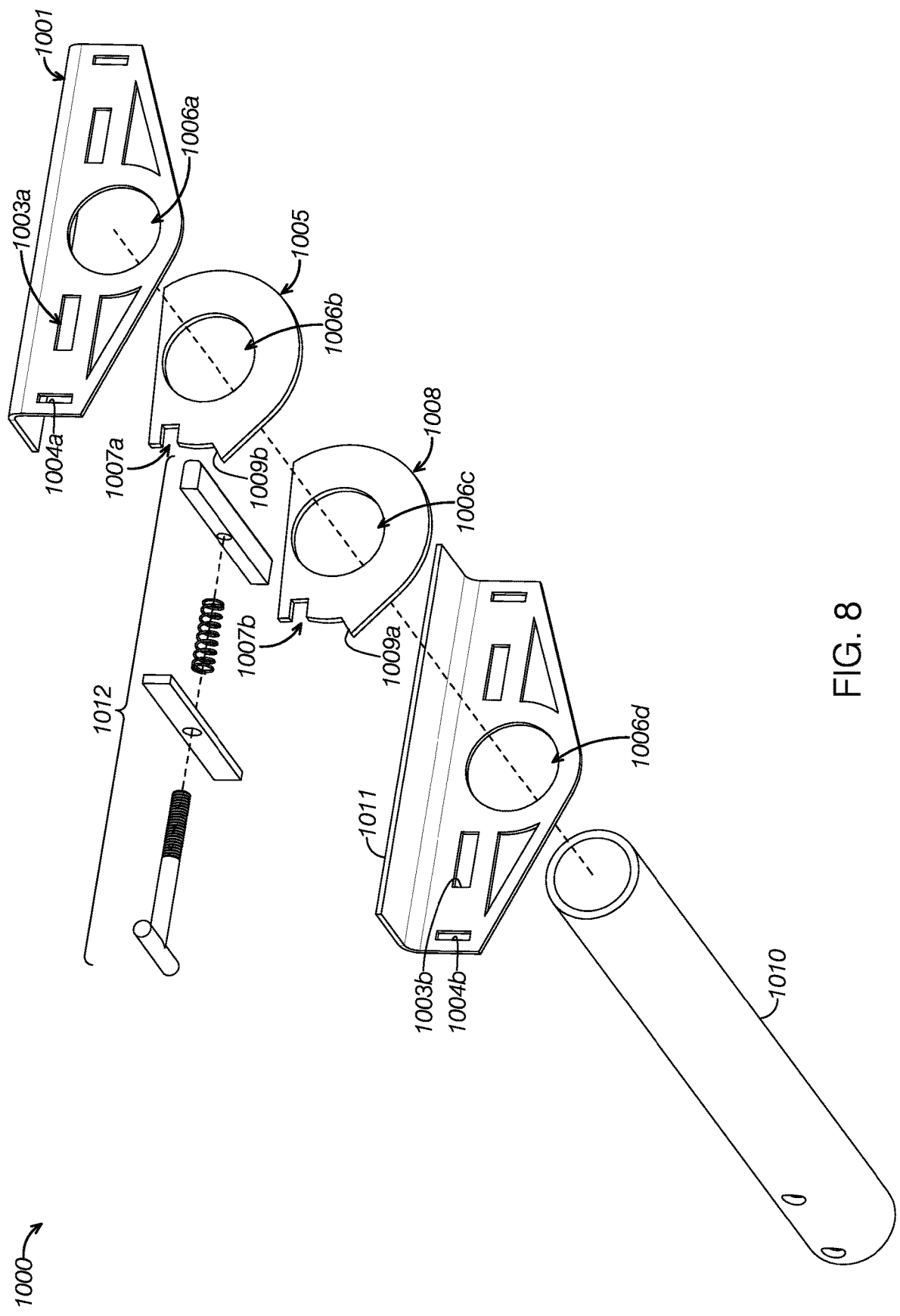
FIG. 8 is an exploded view of the sixth embodiment of the rotating platform.
Figure 9:
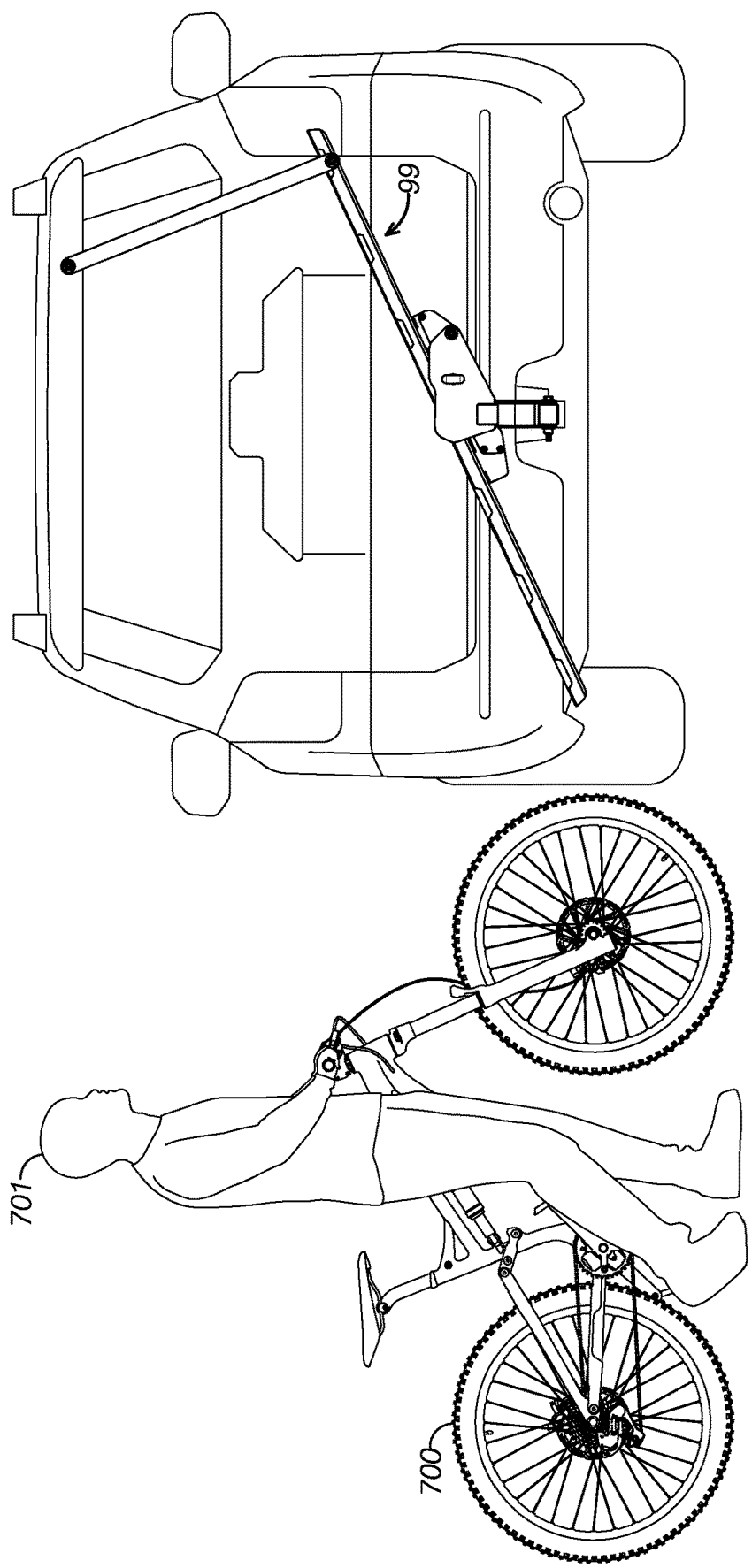
FIG. 9 is a front view of the rotating platform showing the bike rack in the tilt position.

In a sixth embodiment (FIG. 7), rail 1010 acts as a pivot and provides an axis of rotation for the bike rack 101 and rotating platform 1000. Rotating platform 1000 of embodiment six (FIG. 8) comprises faceplate 1001, tilt plate 1005, tilt plate 1008, back plate 1011, and rail 1010. Faceplate 1001, tilt plate 1005, tilt plate 1008, and back plate 1011 all have circular openings 1006a, 1006b, 1006c, and 1006d, respectively, with an inner diameter that allows for slidably with coupling rail 1010 (FIG. 8). Faceplate 1001 and back plate 1011 each has a tilt slot 1003a and 1003b and holes 1004a and 1004b. Tilt plates 1005 and 1008 each have holes 1007a and 1007b; additionally, they have detents 1009a and 1009b. Rotating platform 1000 has spring-loaded pin 1012, which is coupled to holes 1004a and 1004b and coupled to holes 1007a and 1007b. As before, additional holes like 1007a and 1007b could be cut into tilt plates 1005 and 1008 to allow for positions between the driving and tilt stops.

From the driving stop, user 701 unloads a bike by disengaging pin 1012 from holes 1007a and 1007b and rotates platform 1000 to the tilt stop at detents 1009a and 1009b. User 701 then rolls the bike down ramp 101. Starting from the tilt stop, user 701 rolls the bike up ramp 101, and user 701's force causes platform 1000 to automatically disengage from the tilt stop and rotate platform 1000 to the driving stop, and spring-loaded pin 1012 automatically engages holes 1007a and 1007b, thereby locking the platform 1000 in the driving position.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions, and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed inventions that are believed to be novel and non-obvious. Inventions embodied in other combinations and sub-combinations of features, functions, elements, and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A bike rack with a rotating platform where the rotating platform comprises: a faceplate, at least one tilt plate, a pivot, a spring-loaded pin, and at least one tilt slot; where the faceplate has at least one hole; where the tilt plate has a plurality of holes; where the tilt slot is in the tilt plate; where at least one of the holes in the tilt plate is a detent; where the spring-loaded pin is coupled to the faceplate; and the faceplate and tilt plate are coupled to the pivot; and the pivot is offset from the centerline of the rotating platform;
where the tilt slot defines the rotating platform's travel path; where the travel path has two stops, a driving stop, and a tilt stop; when at the driving stop, the tilt slot is concentric with at least one hole in the tilt plate; and when at the tilt stop, the tilt slot is concentric with at least one hole in the tilt plate.

2. The bike rack with rotating platform of claim 1: where the bike rack is coupled to the rotating platform, where the spring-loaded pin engages the detent when the platform is positioned at the tilt stop.

3. The bike rack with rotating platform of claim 2 where: the spring-loaded pin automatically disengages from the detent when user force from rolling a bike up the bike rack causes the platform to move from the tilt stop to the driving stop; when at the driving stop, the spring-loaded pin automatically engages a hole in the tilt plate.

4. A bike rack with a rotating platform where the rotating platform comprises: a rail, a faceplate, at least one tilt plate, a pivot, a pin, and at least one tilt slot; where the faceplate has at least one hole; the tilt plate has a plurality of holes; where at least one of the holes in the tilt plate is a detent; where the tilt slot is in the tilt plate; where the faceplate, and tilt plate, are coupled to the rail; the pin is coupled to the faceplate, and the faceplate and the tilt plate are coupled to the pivot, where the pivot is off center from the platform; and
further comprises: a first tilt plate; a second tilt plate; and a back tilt plate; where the faceplate, first tilt plate, second tilt plate, and back tilt plate are coupled to the pivot; and
where the tilt slot is in the first tilt plate, where the tilt slot is concentric with corresponding holes in the second tilt plate and is concentric with corresponding holes in the back tilt plate.

5. The bike rack with rotating platform of claim 4 where: the pin passes through the tilt slot and the corresponding concentric holes in the second tilt plate and the back tilt plate, or the pin can pass through the tilt slot and the corresponding concentric holes in the second tilt plate.

6. The bike rack with rotating platform of claim 5 where: the tilt slot defines the rotating platform's travel path; where the travel path has two stops, a driving stop and a tilt stop; when at the driving stop, the pin is engaged with the holes in the second tilt plate and the back tilt plate; when at the tilt stop, the pin is engaged with one of the holes in the second tilt plate.

7. The bike rack with rotating platform of claim 6, where: one of the holes in the second tilt plate is a detent.

8. The bike rack with rotating platform of claim 7 where: the tilt slot defines the rotating platform's travel path; where the travel path has two stops, a driving stop, and a tilt stop; when at the driving stop, the pin is engaged with the holes in the second tilt plate and the back plate; when at the tilt stop, the pin is engaged with the detent.

9. The bike rack with rotating platform of claim 8 where the pin is spring loaded and chamfered.

10. The bike rack with rotating platform of claim 9, where the second tilt plate further comprises a slot concentric with the tilt slot, having a first stop and a second stop; where the back tilt plate has a plurality of holes; where the first stop is the driving stop; where the pin may engage with at least one of the plurality of holes in the back tilt plate that are concentric with the tilt slot in the second tilt plate and the tilt slot in the first tilt plate; where the detent is above the second stop.

11. The bike rack with rotating platform of claim 10 where: when at the tilt stop, the spring-loaded chamfered pin engages one of the holes in the second tilt plate or the detent in the second tilt plate.

12. The bike rack with rotating platform of claim 11, further comprising a bike rack coupled to the platform.

13. The bike rack with rotating platform of claim 12, where the bike rack is of sufficient length, and the angle of rotation allows the rack to be close to the ground facilitating loading or unloading a bike when the platform is at the tilt stop.

* * * * *